United States Patent
Harris et al.

(10) Patent No.: US 11,916,429 B2
(45) Date of Patent: Feb. 27, 2024

(54) TEMPERATURE AND STATE OF CHARGE BASED CONTROL OF DARK START AUXILIARY BATTERY FOR BIDIRECTIONAL POWER TRANSFER INVERTER

(71) Applicant: Ford Global Technologies, LLC, Dearborn, MI (US)

(72) Inventors: Timothy Harris, Grosse Ile, MI (US); Stuart C. Salter, White Lake, MI (US); Ryan O'Gorman, Beverly Hills, MI (US); Peter Phung, Windsor (CA); Katherine Howard-Cone, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/539,535

(22) Filed: Dec. 1, 2021

(65) Prior Publication Data

US 2023/0170726 A1  Jun. 1, 2023

(51) Int. Cl.
| | | |
|---|---|---|
| H02J 7/00 | (2006.01) | |
| H02J 3/32 | (2006.01) | |
| B60L 58/27 | (2019.01) | |
| B60L 55/00 | (2019.01) | |
| B60L 58/12 | (2019.01) | |
| B60L 1/02 | (2006.01) | |
| B60L 53/53 | (2019.01) | |
| B60R 16/033 | (2006.01) | |
| H02J 3/38 | (2006.01) | |
| H01M 10/615 | (2014.01) | |
| H01M 10/627 | (2014.01) | |

(Continued)

(52) U.S. Cl.
CPC .......... *H02J 7/007194* (2020.01); *B60L 1/02* (2013.01); *B60L 53/53* (2019.02); *B60L 55/00* (2019.02); *B60L 58/12* (2019.02); *B60L 58/27* (2019.02); *B60R 16/033* (2013.01); *H01M 10/443* (2013.01); *H01M 10/465* (2013.01); *H01M 10/615* (2015.04); *H01M 10/627* (2015.04); *H02J 3/322* (2020.01); *H02J 3/381* (2013.01); *H02J 7/0048* (2020.01); *H02J 7/00712* (2020.01); *H01M 2220/10* (2013.01); *H02J 2300/24* (2020.01)

(58) Field of Classification Search
CPC .......... H02J 3/381; H02J 7/0048; H02J 3/322; B60L 58/12; B60L 58/27; B60L 55/00
USPC .......................................... 307/9.1
See application file for complete search history.

(56) References Cited

U.S. PATENT DOCUMENTS

| | | |
|---|---|---|
| 7,154,068 B2 | 12/2006 | Zhu et al. |
| 10,744,885 B2 | 8/2020 | Jammoul et al. |

(Continued)

FOREIGN PATENT DOCUMENTS

CN   102738537 B   1/2015

*Primary Examiner* — Daniel Kessie
*Assistant Examiner* — Dru M Parries
(74) *Attorney, Agent, or Firm* — David B. Kelley; Brooks Kushman P.C.

(57) ABSTRACT

A power system includes a bidirectional power transfer inverter that receives grid power and can be electrically connected with electric vehicle supply equipment, and an auxiliary battery electrically connected with the bidirectional power transfer inverter and that supplies power to the bidirectional power transfer inverter and electric vehicle supply equipment while the grid power is unavailable.

13 Claims, 3 Drawing Sheets

(51) Int. Cl.
   *H01M 10/44*   (2006.01)
   *H01M 10/46*   (2006.01)

(56) References Cited

U.S. PATENT DOCUMENTS

| | | |
|---|---|---|
| 2008/0226969 A1 | 9/2008 | Fattig |
| 2009/0177595 A1 | 7/2009 | Dunlap et al. |
| 2015/0097525 A1 | 4/2015 | DeDona et al. |
| 2019/0140475 A1* | 5/2019 | Chan .................. H01M 10/615 |
| 2019/0160956 A1* | 5/2019 | Ichikawa ................ B60L 55/00 |

* cited by examiner

TEMPERATURE AND STATE OF CHARGE BASED CONTROL OF DARK START AUXILIARY BATTERY FOR BIDIRECTIONAL POWER TRANSFER INVERTER

TECHNICAL FIELD

This disclosure relates to components for transferring energy between the grid and vehicles.

BACKGROUND

A building energy system may include equipment that allows it to not only receive energy from the grid, but from other sources as well. These other sources can include a local high-voltage energy storage unit, a vehicle high-voltage battery, solar panels, etc. A bidirectional power transfer inverter is often used to facilitate the transfer of power between these various components and/or the building. Among other things, it can covert AC power to DC power and vice versa.

SUMMARY

A power system includes a bidirectional power transfer inverter that receives grid power and can be electrically connected with electric vehicle supply equipment, an auxiliary battery electrically connected with the bidirectional power transfer inverter and that supplies power to the bidirectional power transfer inverter and electric vehicle supply equipment while the grid power is unavailable, and a heater that heats the auxiliary battery. The power system also includes one or more controllers that, responsive to a temperature of the auxiliary battery being less than a target temperature value, command that energy from a traction battery of an automotive vehicle electrically connected with the electric vehicle supply equipment power the heater.

A power system includes a bidirectional power transfer inverter that receives grid power and can be electrically connected with electric vehicle supply equipment, and an auxiliary battery electrically connected with the bidirectional power transfer inverter and that supplies power to the bidirectional power transfer inverter and electric vehicle supply equipment while the grid power is unavailable. The power system also includes one or more controllers that, responsive to a state of charge of the auxiliary battery being less that a predetermined value, command that energy from a traction battery electrically connected with the electric vehicle supply equipment charge the auxiliary battery.

A method for operating a power system includes, responsive to a state of charge of an auxiliary battery that is electrically connected with a bidirectional power transfer inverter and configured to provide power to the bidirectional power transfer inverter during an absence of grid power being less than a predetermined value, charging the auxiliary battery with power from a traction battery electrically connected with the bidirectional power transfer inverter via electric vehicle supply equipment.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
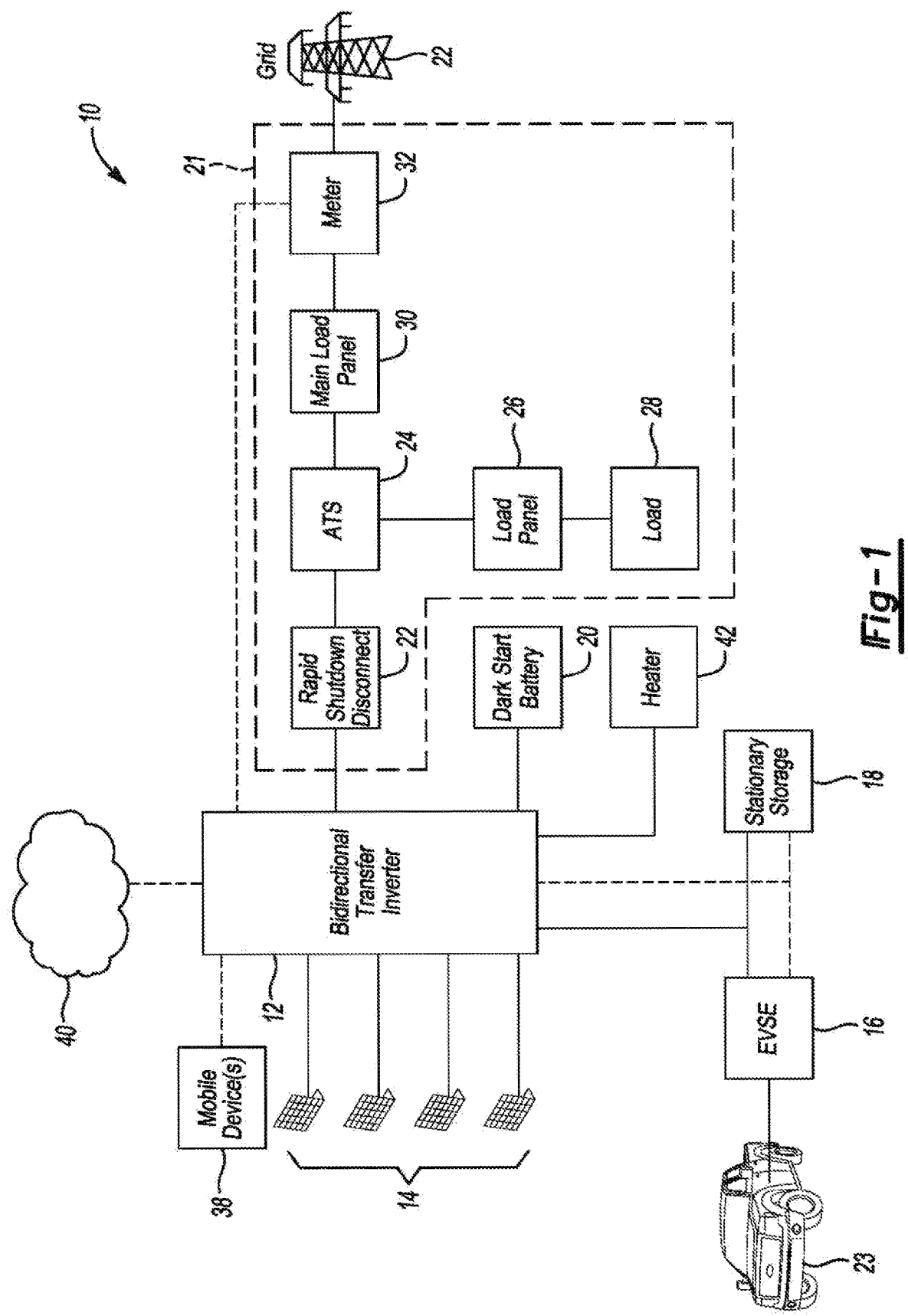
FIG. 1 is a schematic diagram of a power system.

Referring to FIG. 1, a power system 10 includes a bidirectional power transfer inverter 12, various low voltage power sources (e.g., solar panels, etc.) 14, electric vehicle supply equipment 16, stationary storage 18 (e.g., super capacitors, etc.), a dark start auxiliary (e.g., 12V) battery 20, building power equipment (e.g., home power equipment) 21, and grid 22.

The low voltage power sources 14 are electrically connected with the bidirectional power transfer inverter 12, and may provide low voltage DC power to the bidirectional power transfer inverter 12. The electric vehicle supply equipment 16 is electrically connected with the bidirectional power transfer inverter 12. It may provide high voltage DC power to the bidirectional power transfer inverter 12 from a traction battery of a bidirectional power transfer capable vehicle 23, and provide high voltage DC power to the bidirectional power transfer capable vehicle 23 from the grid 22.

The stationary storage 18 is electrically connected with the bidirectional power transfer inverter 12 and the electric vehicle supply equipment 16. It may provide high voltage DC power to the bidirectional power transfer inverter 12, and provide high voltage DC power to the electric vehicle supply equipment 16.

The dark start auxiliary battery 20 is electrically connected with the bidirectional power transfer inverter 12. It may provide low voltage DC power to the bidirectional power transfer inverter 12, and receive low voltage DC power from the bidirectional power transfer inverter 12. The dark start auxiliary battery 20 also includes a battery management controller system to facilitate certain control operations described in more detail below.

The building power equipment 21 includes a rapid shutdown disconnect 22, automatic transfer switch 24, load panel 26 and corresponding load 28, main load panel 30, and meter 32. The rapid shutdown disconnect 22 is electrically connected between the bidirectional inverter 12 and automatic transfer switch 24. The main load panel 30 and meter 32 are electrically connected between the automatic transfer switch 24 and grid 22. And the load panel 26 is electrically connected between the automatic transfer switch 24 and load 28. The home power equipment 22 is thus arranged to receive AC power from and provide AC power to the bidirectional power transfer inverter 12, and receive AC power from the grid 22.

The bidirectional power transfer inverter 12 is in communication with the electric vehicle supply equipment 16, stationary storage 18, battery management control system of the auxiliary battery 20, and meter 32. Additionally, the bidirectional power transfer inverter 12 may communicate with mobile devices 38 via wireless communication technology and various cloud services 40 via the Internet.

The bidirectional power transfer inverter 12 is thus a hub that can facilitate the transfer of power (whether AC or DC, and low voltage or high voltage) between the low voltage sources 14, electric vehicle supply equipment 16, stationary storage 18, and building power equipment 21. That is, AC power may flow from the grid 22, through the building power equipment 21, bidirectional power transfer inverter 12, and electric vehicle supply equipment 16 to the bidirectional power transfer capable vehicle 23. DC power may flow from the stationary storage 18 and/or electric vehicle supply equipment 16 (from the traction battery of the bidirectional power transfer capable vehicle 23), through the bidirectional power transfer inverter 12, which transforms the power from DC to AC, to the building power equipment 21. Such power transfer, however, requires the bidirectional power transfer inverter 12 and electric vehicle supply equipment 16 to undergo initialization or startup operations. These operations require electrical energy.

When the grid 22 becomes unavailable, the automatic transfer switch 24 opens to disconnect the grid 22 from the bidirectional power transfer inverter 12, makes available energy reserves from any super capacitor, notifies one or more controllers of the bidirectional power transfer inverter 12 of the outage, and instructs the one or more controllers of the bidirectional power transfer inverter 12 to switch sources of reserve energy (e.g., the stationary storage 18, the traction battery of the bidirectional power transfer capable vehicle 23, etc.). There may be instances, however, in which the reserve energy is unable to activate control circuitry and electronics of the bidirectional power transfer inverter 12 when no substantial power from the grid 22 is available to facilitate communications or other functionality. During such unstable or down grid situations, the bidirectional power transfer inverter 12 may be incapable of activating because it needs electricity to start and run. The auxiliary battery 20, as suggested above however, may provide low voltage DC power to the bidirectional power transfer inverter 12 and electric vehicle supply equipment 16 responsive to commands of controllers therefrom that permits the bidirectional power transfer inverter 12 and electric vehicle supply equipment 16 to restart operations even in the absence of a connection to the grid 22.

The topology of the power system 10 thus provides a dynamic bidirectional power transfer inverter 12 and electric vehicle supply equipment 16 with dark start battery connections for unstable/down grid situations. Upon completion of AC architecture soft start operations, which involve activation of control circuitry and electronics with low voltage power, the bidirectional power transfer inverter 12 can facilitate a switch-over from using power from the auxiliary battery 20 to using power from the traction battery of the bidirectional power transfer capable vehicle 23 and/or power from the stationary storage 18. This switch-over involves ramping down the power from the auxiliary battery 20 and ramping up the power from the traction battery of the bidirectional power transfer capable vehicle 23 and/or the power from the stationary storage 18. Moreover, this proposed configuration offers further flexibility in providing alternative power options upon start-up. Rather than providing start-up power from the auxiliary battery 20 only, the low voltage power sources 14 may also be used for AC architecture soft start activities. That is, initialization activities of the bidirectional power transfer inverter 12 and electric vehicle supply equipment 16 may be powered by the low voltage power sources 14 instead of the auxiliary battery 20 during unstable/down grid situations.

Operation of the auxiliary battery 20 can be affected by ambient temperatures or state of charge of the auxiliary battery 20. If ambient temperatures are low, a temperature of the auxiliary battery 20 may likewise be low—creating less than ideal conditions for battery discharge. If the state of charge of the auxiliary battery 20 is low, the auxiliary battery 20 may not have sufficient energy to power start up activities of the bidirectional power transfer inverter 12 or electric vehicle supply equipment 16. The one or more controllers of the bidirectional power transfer inverter 12 and/or the auxiliary battery 20 may implement strategies to handle these situations.

Figure 2:
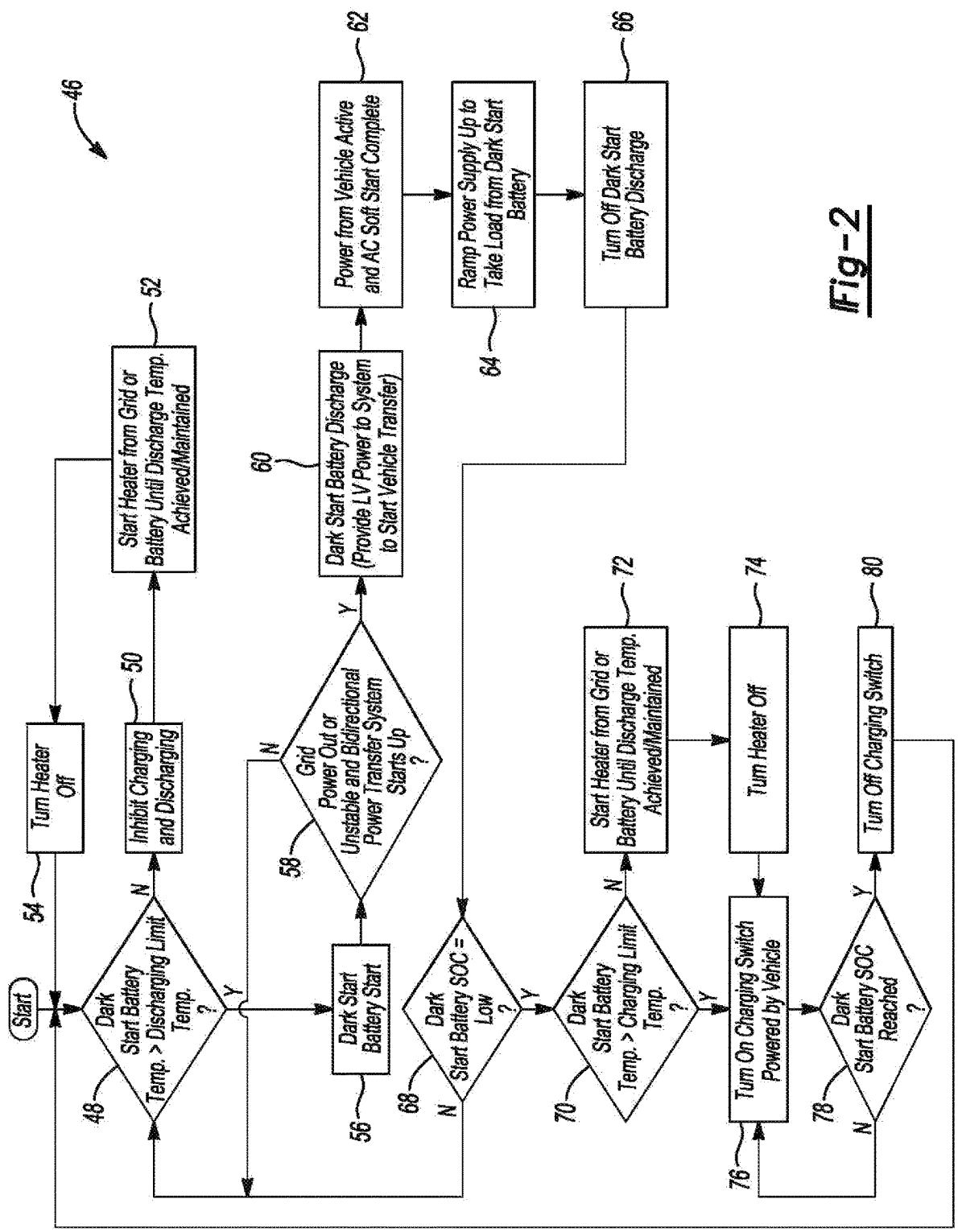
FIG. 2 is a flow chart of an algorithm for charge and discharge control of a dark start auxiliary battery.

Referring to FIGS. 1 and 2, the power system 10 further includes a heater 42 electrically connected with the bidirectional power transfer inverter 12 and arranged to provide heat to the auxiliary battery 20. The power system 10 also includes various current, voltage, and temperature sensors arranged to provide such data to the one or more controllers mentioned above. Responsive to the one or more controllers being notified, for example, of loss of grid power from the automatic transfer switch 24, the algorithm 46 may be performed. The algorithm 46 may also be performed periodically regardless of the absence/presence of grid power, or responsive to other conditions, etc.

At operation 48, it is determined whether a temperature of the auxiliary battery 20 is greater than a predetermined discharge temperature limit (e.g., 10° C.). If no, charging and discharging of the auxiliary battery 20 is inhibited at operation 50. At operation 52 (and while charging and discharging is inhibited), the heater 42 is powered with energy from the grid 22 (if available) or traction battery of the bidirectional power transfer capable vehicle 23 (if available) until a desired temperature (e.g., 15°) is achieved. The heater 42 is then turned off at operation 54, and the algorithm returns to operation 48.

If yes, the auxiliary battery 20 is prepared for activity at operation 56. At operation 58, it is determined whether grid power is unavailable such that power transfer from the auxiliary battery 20 to the bidirectional power transfer inverter 12 is required. The one or more controllers, for example, may receive notification from the automatic transfer switch 24 that grid power is unavailable as mentioned above. Alternatively, current and/or voltage sensors arranged with the grid equipment 22 may indicate that grid power is unstable/unavailable, etc. If no, the algorithm returns to operation 48. If yes, the auxiliary battery 20 is discharged to the bidirectional power transfer inverter 12 to provide low voltage power for the bidirectional power transfer inverter 12 and electric vehicle supply equipment 16 to perform soft start activities at operation 60. At operation 62, power from the traction battery of the bidirectional power transfer capable vehicle 23 is available via the electric vehicle supply equipment 16 indicating that the soft start activities are complete. At operation 64, power from the traction battery 24 is ramped up, and discharge of the auxiliary battery 20 is stopped at operation 66.

At operation 68, it is determined whether a state of charge of the auxiliary battery 20 is less than a predetermined floor value (e.g., 50%). If no, the algorithm returns to operation 48. If yes, at operation 70 it is determined whether a temperature of the auxiliary battery 20 is greater than the predetermined discharge temperature limit. If no, the heater 42 is powered with energy from the grid 22 (if available) or traction battery of the bidirectional power transfer capable vehicle 23 (if available) until the desired temperature is achieved at operation 72. The heater 42 is then turned off at operation 74.

At operation 76, the auxiliary battery 20 is charged with energy from the traction battery of the bidirectional power transfer capable vehicle 23 via the electric vehicle supply equipment 16 and the bidirectional power transfer inverter 12. At operation 78, it is determined whether the state of charge of the auxiliary battery 20 is greater than a target value (e.g., 80%). If no, the algorithm returns to operation 76. If yes, the charging of the auxiliary battery 20 is stopped at operation 80. The algorithm then returns to operation 48.

Figure 3:
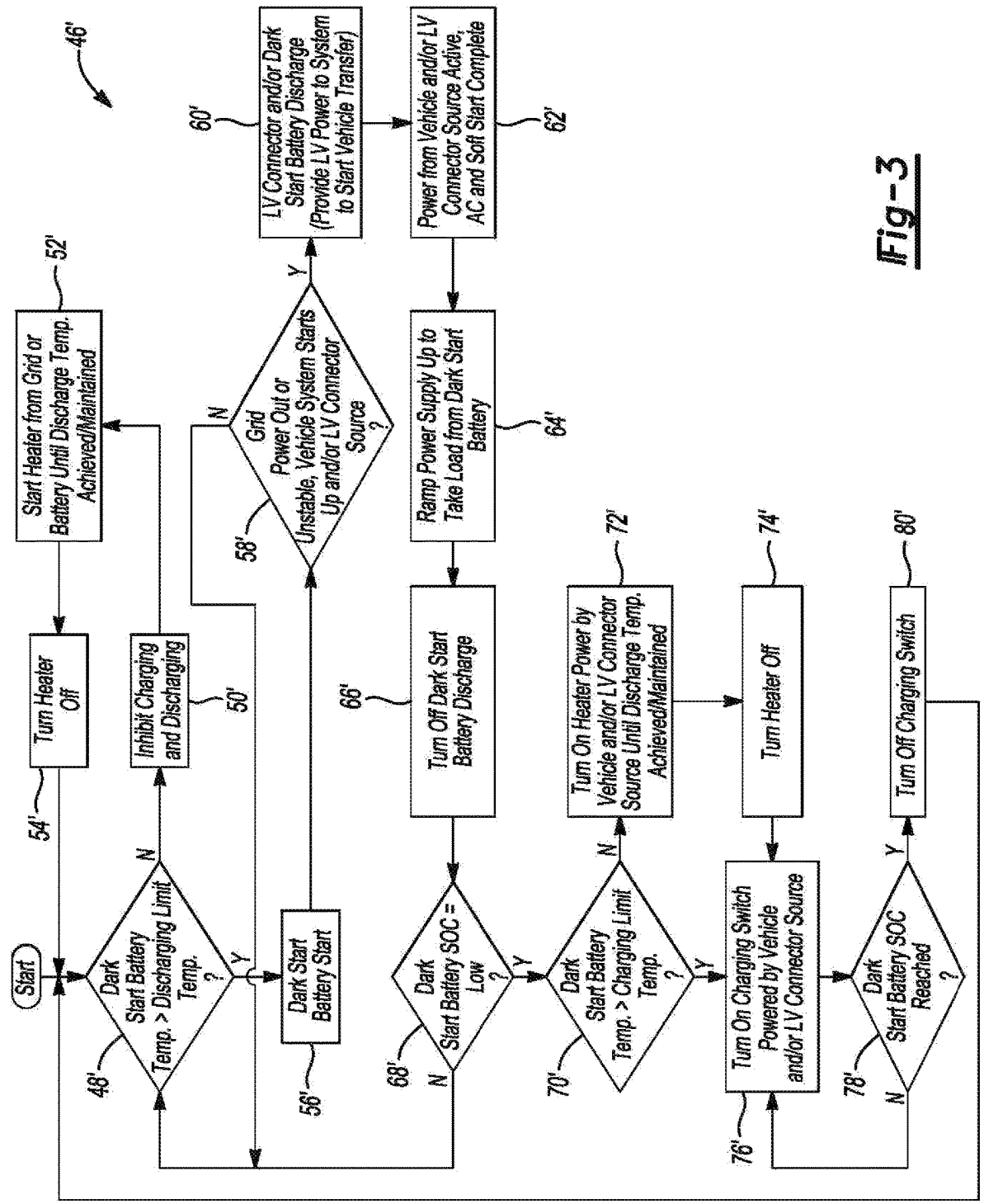
FIG. 3 is a flow chart of another algorithm for charge and discharge control of a dark start battery.

Referring to FIGS. 1 and 3, responsive to the one or more controllers being notified, for example, of loss of grid power from the automatic transfer switch 24, the algorithm 46' may be performed. The algorithm 46' may also be performed periodically regardless of the absence/presence of grid power, or responsive to other conditions, etc. At operation 48', it is determined whether a temperature of the auxiliary battery 20 is greater than a predetermined discharge temperature limit. If no, charging and discharging of the auxiliary battery 20 is inhibited at operation 50'. At operation 52' (and while charging and discharging is inhibited), the heater 42 is powered with energy from the grid 22 or traction battery of the bidirectional power transfer capable vehicle 23 until a desired temperature is achieved. The heater 42 is then turned off at operation 54', and the algorithm returns to operation 48'.

If yes, the auxiliary battery 20 is prepared for activity at operation 56'. At operation 58', it is determined whether grid power is unavailable such that power transfer from the low voltage sources 14 or auxiliary battery 20 to the bidirectional power transfer inverter 12 is required. If no, the algorithm returns to operation 48'. If yes, the low voltage sources 14 or auxiliary battery 20 are discharged to the bidirectional power transfer inverter 12 to provide low voltage power for the bidirectional power transfer inverter 12 and electric vehicle supply equipment 16 to perform soft start activities at operation 60'. At operation 62', power from the traction battery of the bidirectional power transfer capable vehicle 23 is available via the electric vehicle supply equipment 16 indicating that the soft start activities are complete. At operation 64', power from the traction battery 24 is ramped up, and discharge of the low voltage sources 14 or auxiliary battery 20 is stopped at operation 66'.

At operation 68', it is determined whether a state of charge of the auxiliary battery 20 is less than a predetermined floor value. If no, the algorithm returns to operation 48'. If yes, at operation 70' it is determined whether a temperature of the auxiliary battery 20 is greater than the predetermined discharge temperature limit. If no, the heater 42 is powered with energy from the low voltage sources 14, grid 22, or traction battery of the bidirectional power transfer capable vehicle 23 until the desired temperature is achieved. The heater 42 is then turned off at operation 74'.

At operation 76', the auxiliary battery 20 is charged with energy from the low voltage sources 14 or traction battery of the bidirectional power transfer capable vehicle 23. At operation 78', it is determined whether the state of charge of the auxiliary battery 20 is greater than a target value. If no, the algorithm returns to operation 76'. If yes, the charging of the auxiliary battery 20 is stopped at operation 80'.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words controller and controllers, for example, can be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system comprising:
   a bidirectional power transfer inverter configured to receive grid power and be electrically connected with electric vehicle supply equipment;
   an auxiliary battery electrically connected with the bidirectional power transfer inverter and configured to supply power to the bidirectional power transfer inverter and electric vehicle supply equipment;
   a storage battery electrically connected with the bidirectional power transfer inverter and
   one or more controllers programmed to, after activation of control circuitry of the bidirectional power transfer inverter using power from the auxiliary battery while the grid power is unavailable, ramp down the power from the auxiliary battery and ramp up power to the bidirectional power transfer inverter from the storage battery or from a traction battery of an automotive vehicle electrically connected with the electric vehicle supply equipment.

2. The power system of claim 1, wherein the auxiliary battery is a 12 volt battery.

3. The power system of claim 1, wherein the bidirectional power transfer inverter is further configured to power building power equipment with energy from the traction battery.

4. The power system of claim 1 further comprising a heater configured to heat the auxiliary battery, and wherein the one or more controllers are further programmed to, responsive to a temperature of the auxiliary battery being less than a target temperature value, command that energy from the traction battery power the heater.

5. The power system of claim 4, wherein the one or more controllers are further programmed to, responsive to a state of charge of the auxiliary battery being less that a predetermined value, command that energy from the traction battery charge the auxiliary battery.

6. The power system of claim 4 further comprising solar panels electrically connected with the bidirectional power transfer inverter, wherein the one or more controllers are further programmed to, responsive to the temperature being less than the target temperature value, command that energy from the solar panels power the heater.

7. A powersystem comprising:
- a bidirectional powertransfer inverter configured to receive grid power and be electrically connected with electric vehicle supply equipment;
- an auxiliary battery electrically connected with the bidirectional powertransfer inverter and configured to supply powerto the bidirectional power transfer inverter and electric vehicle supply equipment while the grid power is unavailable;
- a storage battery electrically connected with the bidirectional power transfer inverter; and
- one or more controllers programmed to,
  - responsive to a state of charge of the auxiliary battery being less that a predetermined value, command that energyfrom a traction battery electrically connected with the electric vehicle supply equipment charge the auxiliary battery, and
  - after activation of control circuitry of the bidirectional powertransfer inverter using powerfrom the auxiliary battery while the grid power is unavailable, ramp down the powerfrom the auxiliary battery and ramp up powerto the bidirectional power transfer inverter from the traction battery or the storage battery.

8. The power system of claim 7 further comprising a heater configured to heat the auxiliary battery, wherein the one or more controllers are further programmed to, responsive to a temperature of the auxiliary battery being less than a target temperature value, command that energy from the traction battery power the heater.

9. The power system of claim 8 further comprising solar panels electrically connected with the bidirectional power transfer inverter, wherein the one or more controllers are further programmed to, responsive to a temperature of the auxiliary battery being less than a target temperature value, command that energy from the solar panels power the heater.

10. The power system of claim 7, wherein the bidirectional power transfer inverter is further configured to power building power equipment with energy from the traction battery.

11. A method for operating a power system comprising:
- responsive to a state of charge of an auxiliary battery that is electrically connected with a bidirectional power transfer inverter and configured to provide power to the bidirectional power transfer inverter during an absence of grid power being less than a predetermined value, charging the auxiliary battery with power from a traction battery electrically connected with the bidirectional power transfer inverter via electric vehicle supply equipment;
- responsive to a temperature of the auxiliary battery being less than a target temperature value, powering a heater configured to heat the auxiliary battery with energy from the traction battery; and
- after activation of control circuitry of the bidirectional power transfer inverter using power from the auxiliary battery while the grid power is unavailable, ramping down the power from the auxiliary battery and ramping up power to the bidirectional power transfer inverter from a storage battery.

12. The method of claim 11 further comprising, responsive to a temperature of the auxiliary battery being less than a target temperature value, powering a heater configured to heat the auxiliary battery with energy from solar panels electrically connected with the bidirectional power transfer inverter.

13. The method of claim 11 further comprising powering building power equipment with energy from the traction battery.

* * * * *